_(12)_ United States Patent
Ninan et al.

(10) Patent No.: US 8,228,804 B2
(45) Date of Patent: Jul. 24, 2012

(54) TUNING ROUTING METRICS TO REDUCE MAXIMUM LINK UTILIZATION OR PROVIDE FAILURE RESILIENCY

(75) Inventors: Bobby Ninan, Raleigh, NC (US); Gordon M. Bolt, Apex, NC (US); Olivier Goldschmidt, Berkeley, CA (US)

(73) Assignee: OPNET Technologies, Inc., Bethesda, MD (US)

( * ) Notice: Subject to any disclaimer, the term of this patent is extended or adjusted under 35 U.S.C. 154(b) by 270 days.

(21) Appl. No.: 12/143,799

(22) Filed: Jun. 22, 2008

(65) Prior Publication Data

US 2009/0022056 A1    Jan. 22, 2009

Related U.S. Application Data

(60) Provisional application No. 60/950,574, filed on Jul. 18, 2007, provisional application No. 61/022,563, filed on Jan. 22, 2008.

(51) Int. Cl.
*G01R 31/08*    (2006.01)

(52) U.S. Cl. ...................................................... 370/238

(58) Field of Classification Search .................. 370/235, 370/238, 238.1, 255
See application file for complete search history.

(56) References Cited

U.S. PATENT DOCUMENTS 6,760,314 B1 *    7/2004    Iwata ............................ 370/254
2007/0195702 A1 *    8/2007    Yuen et al. ..................... 370/238
2007/0248016 A1 *    10/2007    Ashwood Smith et al. .. 370/238
2008/0037552 A1 *    2/2008    Dos Remedios et al. ........................ 370/395.21

FOREIGN PATENT DOCUMENTS

WO    WO 2008/011354 A2    1/2008

OTHER PUBLICATIONS

Fortz, B., et al; Optimizing OSPF/IS-IS Weights in a Changing World; IEEE Journal on Selected Areas in Communications; May 2002;vol. 20, No. 4, pp. 756-767.

* cited by examiner

*Primary Examiner* — Derrick Ferris
*Assistant Examiner* — Matthew Hopkins
(74) *Attorney, Agent, or Firm* — Robert M. McDermott

(57) ABSTRACT

A metric tuning technique optimizes the maximum link utilization of a set of links incrementally. Changes to the metric are constrained to be metric increases to divert routes from select links, thereby minimizing the number of changes required to achieve the optimization by avoiding the potential cascade of changes caused by attracting routes to a link. An interactive user interface is provided to allow a user to specify limits and constraints, and to select the sets of links to be addressed, including, for example, only the links that exceed a given link utilization threshold, the links having the highest link utilizations, the links having the highest failure effect, and so on. This incremental optimization technique is also used to optimize network resiliency by minimizing the network degradation caused by the failure of one or more links.

15 Claims, 4 Drawing Sheets

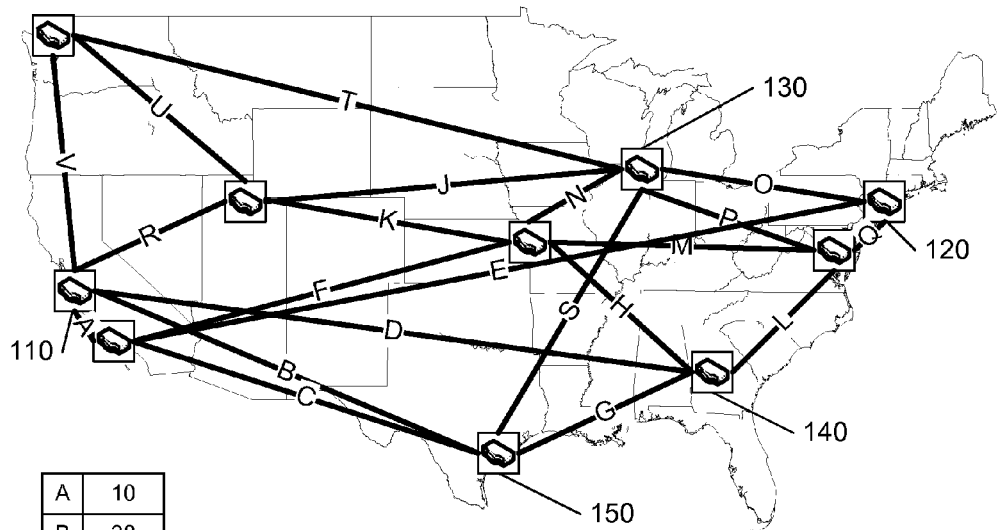
FIG. 1A [PRIOR ART]
| A | 10 |
|---|----|
| B | 38 |
| C | 24 |
| D | 44 |
| E | 40 |
| F | 16 |
| G | 8 |
| H | 10 |
| J | 22 |
| K | 16 |
| L | 8 |
| M | 18 |
| N | 4 |
| O | 12 |
| P | 12 |
| Q | 6 |
| R | 20 |
| S | 26 |
| T | 28 |
| U | 16 |
| V | 18 |
FIG. 1B [PRIOR ART]
| | D-L-Q | 58 |
|---|---|---|
| SF-NY 60Mb | A-E | 50 |
| | A-F-N-O | 42 |
| | R-J-O | 54 |
| | R-K-N-O | 52 |
| | R-J | 42 |
|---|---|---|
| SF-CH 40Mb | R-K-N | 40 |
| | A-F-N | 30 |
| | V-T | 46 |
| SF-HO 20Mb | B | 38 |
|---|---|---|
| | A-C | 34 |
| SF-AT 40Mb | D | 44 |
|---|---|---|
| | B-G | 46 |
| | A-C-G | 42 |
| | R-K-H | 46 |
| | A-F-H | 36 |
FIG. 1C [PRIOR ART]
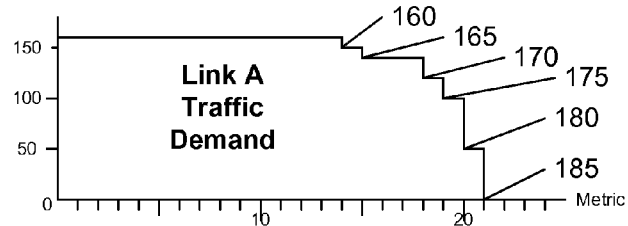
FIG. 1D [PRIOR ART]

TUNING ROUTING METRICS TO REDUCE MAXIMUM LINK UTILIZATION OR PROVIDE FAILURE RESILIENCY

This application claims the benefit of U.S. Provisional Patent Applications 60/950,574, filed 18 Jul. 2007, and 61/022,563, filed 22 Jan. 2008

BACKGROUND AND SUMMARY OF THE INVENTION

This invention relates to the field of network engineering and analysis, and in particular to a method and system for managing traffic flow in a network for efficient link utilization and resilient performance under failure conditions.

Routing algorithms are generally structured to select a route for traffic between nodes of a network based on the relative 'cost' associated with each potentially available route. For example, an Interior Gateway Protocol (IGP) is commonly used on Internet Protocol (IP) networks to determine the optimal route from a source node to a destination node based on a total cost of each available route, using one or more metrics for determining such costs. Example Interior Gateway Protocols include Routing Information Protocol (RIP), Open Shortest Path First (OSPF), and Intermediate System to Intermediate System (IS-IS) protocols.

Typically, when a link is added to a network, the metric is assigned at the interface to the link, reflecting the relative cost/impact of using the link. For example, if the link is a high capacity link, the relative impact of sending a packet over the link is generally slight, compared to the impact of sending that same packet over a link with very limited capacity. By assigning low costs to high capacity links, and high costs to low capacity links, more traffic will generally be routed by such cost/metric based routing algorithms to the high capacity links, thereby avoiding congestion on the low capacity links.

FIG. 1A illustrates an example network with links A-V between nodes of the network. FIG. 1B illustrates an example set of metrics associated with each link A-V, and FIG. 1C illustrates an example set of routes and composite metrics associated with each. In this example, only four traffic flow demands are presented for consideration, from San Francisco 110 to each of: New York 120 (SF-NY, 60 Mb/s), Chicago 130 (SF-CH, 40 Mb/s), Atlanta 140 (SF-AT, 40 Mb/s), and Houston 150 (SF-HO, 20 Mb/s). The composite metric for the routes is determined in this example as the sum of the metrics of the links along the route; other techniques for determining a composite metric based on link metrics may also be used, such as a composite that is based on the metric of each link and the number of links (hops) along the route.

In FIG. 1C, five sample routes are illustrated for the traffic from SF 110 to NY 120. The first route, using links D (SF to AT), L (AT to DC), and Q (DC to NY), has a composite metric of 58 (44+8+6); the second route, A-E, has a composite metric of 50 (10+40), the third route, A-F-N-O, has a composite metric of 42 (10+16+4+12), and so on. Based on these composite metrics, the 60 Mb/s traffic from SF to NY is preferably routed along the route A-F-N-O, the route with the lowest composite metric. In like manner, the 40 Mb/s traffic from SF to CH is preferably routed along A-F-N; the 20 Mb/s traffic from SF to HO along route A-C; and the 40 Mb/s traffic from SF to AT along route A-F-H.

It is significant to note that in this example, each of the preferred routes include the link A. Therefore all of the traffic from SF to NY, CH, HO, and AT will travel over link A. With the routing in this example, link A will have 160 Mb/s of load. Whether or not link A can efficiently handle this load is based on the capacity of link A. If link A's capacity is 320 Mb/s, for example, its utilization is 50%; if link A's capacity is under 160 Mb/s, link A is over-utilized, and the traffic demand will not be satisfied. Network managers strive to avoid over-utilized links, and try to minimize the link utilization on each of the links to assure efficient traffic flow across the network.

Traffic engineering addresses techniques for optimizing network performance, including the configuration of resources of a network to provide effective and efficient traffic flow through the network. In "Internet Traffic Engineering by Optimizing OSPF weights" at IEEE INFOCOM 2000, B. Fortz and M. Thorup presented the concept of adjusting the metrics assigned to links from their initially assigned values so as to cause devices that use an existing routing protocol (OSPF) to select different routes than those selected based on the default metric values, to achieve an overall desired traffic flow through the network. Extensions for dealing with varying traffic and transient link failures were proposed by Fortz et al. (B. Fortz and M. Thorup. "Optimizing OSPF/IS-IS weights in a changing world", IEEE JSAC 2001) and Nucci et al. (Nucci et al. "IGP link weight assignment for transient link failures", ITC 2003) respectively. Currently in the commercial arena, Cariden Technologies (www.cariden.com) and WANDL (www.wandl.com) have competing solutions for IGP metric optimization.

Techniques that provide for global optimization of networks are well suited for an initial installation of a network, and for ongoing management of small networks, but are generally poorly suited for routine ongoing maintenance of large networks. Often, relatively minor changes to a network can have a major effect on determining the optimal solution in a large network, due to the cascading of change effects. For example, a relatively minor reduction in a link's metric may 'attract' a large number of routes that previously had relatively equivalent costs, and other metrics may need to be adjusted to subsequently attract some of the traffic from this now-overloaded link. That is, a minor improvement in network performance may require a substantial number of individual metric changes, as the conventional processes strive to tune the network for truly optimal performance.

It would be advantageous to provide improvements to network performance in an incremental manner, preferably with minimal changes to the configuration of devices in the network. It would also be advantageous to identify and address the links that are in violation of a maximum link utilization threshold, as well as the links whose failure will introduce a significant number of threshold violations.

These advantages, and others, can be realized by a metric tuning technique that optimizes the maximum link utilization of a set of links incrementally. Changes to the metric are constrained to be metric increases to divert routes from select links, thereby minimizing the number of changes required to achieve the optimization by avoiding the potential cascade of changes caused by attracting routes to a link. An interactive user interface is provided to allow a user to specify limits and constraints, and to select the sets of links to be addressed, including, for example, only the links that exceed a given link utilization threshold, the links having the highest link utilizations, the links having the highest failure effect, and so on. This incremental optimization technique is also used to optimize network resiliency by minimizing the network degradation caused by the failure of one or more links.

BRIEF DESCRIPTION OF THE DRAWINGS

The invention is explained in further detail, and by way of example, with reference to the accompanying drawings wherein:

FIGS. 1A-1D illustrate an example network, routing metrics, routes, and traffic load as a function of the metric for an example link.

Throughout the drawings, the same reference numerals indicate similar or corresponding features or functions. The drawings are included for illustrative purposes and are not intended to limit the scope of the invention.

DETAILED DESCRIPTION

In the following description, for purposes of explanation rather than limitation, specific details are set forth such as the particular architecture, interfaces, techniques, etc., in order to provide a thorough understanding of the concepts of the invention. However, it will be apparent to those skilled in the art that the present invention may be practiced in other embodiments, which depart from these specific details. In like manner, the text of this description is directed to the example embodiments as illustrated in the Figures, and is not intended to limit the claimed invention beyond the limits expressly included in the claims. For purposes of simplicity and clarity, detailed descriptions of well-known devices, circuits, and methods are omitted so as not to obscure the description of the present invention with unnecessary detail.

FIG. 1A illustrates an example network.

Figure 2:
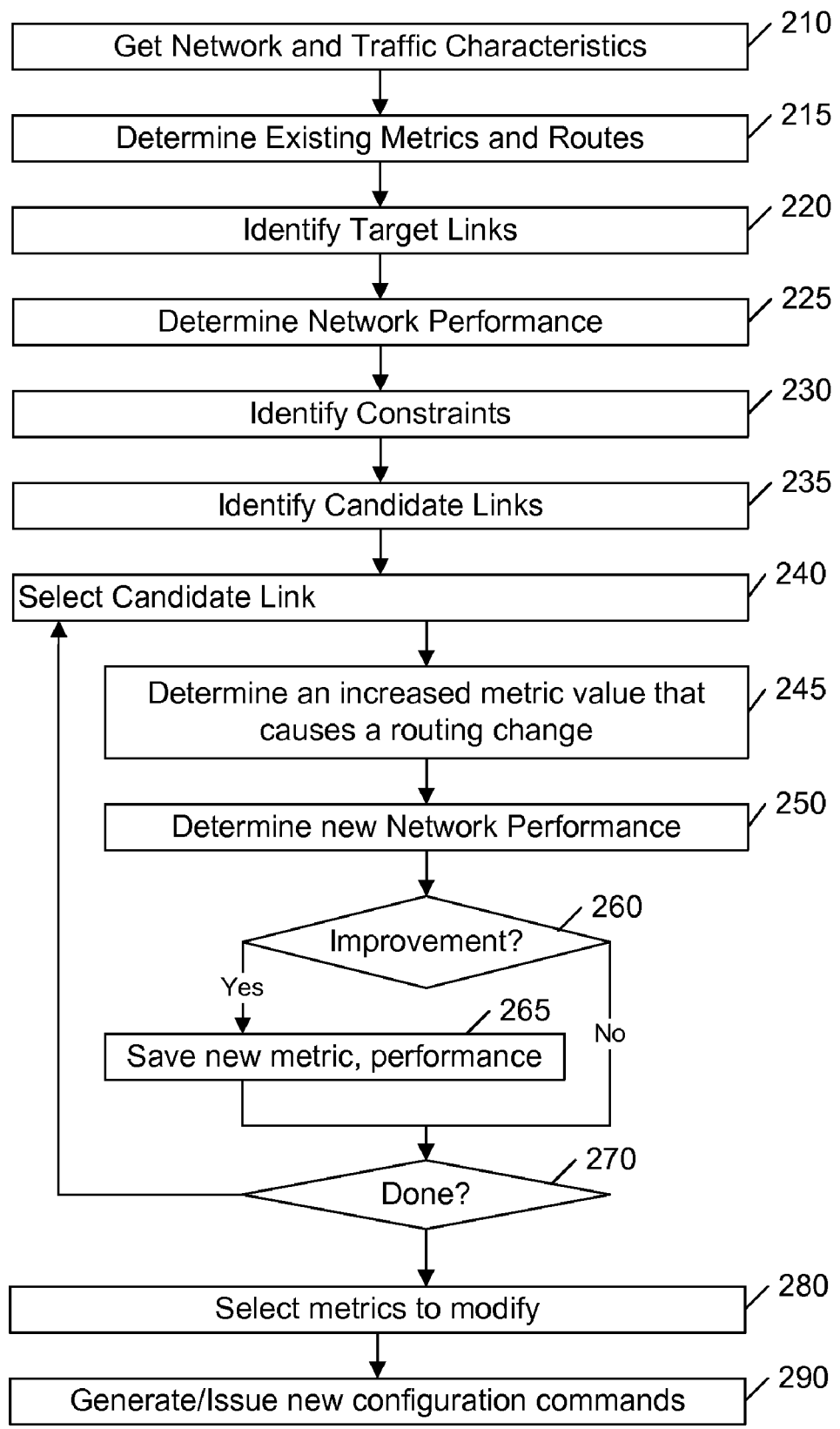
FIG. 2 illustrates an example flow diagram for iteratively improving network performance in accordance with an aspect of this invention.

The flow diagram of FIG. 2 provides an overview of a first aspect of this invention; additional features and alternatives are presented further on.

At 210, the network and traffic characteristics are obtained. These characteristics include, for example, the network topology and the traffic matrix. The network topology includes an identification of each of the links of the network, and their characteristics, such as the routing protocol used at the interfaces to the links. The traffic characteristics identify the amount of traffic flowing between nodes of the network. Other parameters and characteristics may also be obtained, as required for subsequent processes.

At 215, the network is assessed to determine the existing metrics that are used for creating routes on this network. Generally, the particular routing protocol is predefined, and may include, for example, Open Shortest Path First (OSPF), and Intermediate System to Intermediate System (IS-IS) protocols. As discussed subsequently, the particular routing protocol used at each interface to each link is used in the system of this invention to determine resultant routes as the metrics are changed. For comparative consistency, the system is also preferably used to determine the routes corresponding to the existing metrics. Optionally, some or all of the metrics of the network can be initialized to default or particularly defined values, to allow the system to start from a preferred baseline configuration.

At 220, the links that are to be targeted for optimization are identified. For ease of reference and understanding, two sets of links are defined herein, target links and candidate links. Target links are the links for which the performance of the network is evaluated and potentially improved. Candidate links are the links that are available for change. Generally, these sets of links are the same, but in some cases, are preferably different. For example, a user may specify links that may not be changed, or that may only be changed in a particular manner. Often, such links are on 'sensitive' routes, such as routes for particularly important customers, routes that have been optimized for a particular purpose, and so on. Although, for example, the metric associated with the links along a sensitive route may be specified to remain the same, thereby maintaining the existing route, these links would generally be included in the determination of the measure of overall system performance, because a metric change at another link might either reduce or increase the utilization of the targeted link. In like manner, the optimization may be targeted to cure known problems on particular links, and changes to any link that is not barred from change would be a candidate for change consideration.

Any of a variety of techniques may be used to identify the set of target links, ranging, for example, from having a user explicitly identify each link, to performing an exhaustive assessment of all links. Generally, the user identifies any links that are known to be problematic, or instructs the system to assess the "N" links with the highest link utilization, or instructs the system to assess any link that violates one or more constraints, and so on. In addition to such 'targeted' assessments, the system may also be configured to select random target links for assessment, to determine if improvements can be achieved.

At 225, a measure of network performance is determined with regard to the targeted links. Any of a variety of network performance measures may be used to assess the effectiveness of the current routing over these links. In an example embodiment of this invention, link utilization is used as a measure of effectiveness, and the peak link utilization among the targeted links is used as a network performance measure. In like manner, a threshold value of link utilization can be specified, and the number of targeted links that exceed this threshold value can be used as the network performance measure. Other statistics based on link utilization, such as average, mean, variance, and so on, may also be used. Other parameters may also be used, such as throughput, delay, number of links/hops per path, and so on. Preferably, a network performance measure that is easy to determine is preferred, to facilitate rapid iterative performance determinations.

The measure of network performance is typically a combination of individual performance measures. For example, the measure may be dependent upon the peak link utilization as well as other measures, such as the average link utilization, the number of link utilizations that exceed a threshold limit, and so on.

At 230, the constraints that are to be applied to the optimization are specified. In a typical embodiment, the constraints include both operational and parametric constraints. Operational constraints may include, for example, an identification of links that should not be modified, high priority links, and so on, while parametric constraints may include, for example, limits imposed on system or network parameters, such as link utilization, the possible values for the metric, the number of links exceeding a given threshold, the number of demands using each link, and so on.

At 235, the set of change candidates is determined. In one embodiment, any link whose metric is not explicitly prohibited from change can be identified as a candidate link. In many cases, the set of candidate links is determined based on the constraints specified above. For example, the set of change candidates might include only those links whose utilization is above 80%.

The loop 240-280 selects a candidate link from the set of change candidates and determines whether an improvement in the measure of system performance can be achieved by modifying the metric that characterizes this link to the routing protocol. Preferably, candidate links are selected in decreasing order based on utilization, but other selection criteria could also be used. Although the process 240-280 is illustrated as a sequential, one link after another, process, for ease of illustration and understanding, one of skill in the art will recognize that the system can be configured to identify improvements to the system performance based on multiple modifications to a select set of links.

At 245, the candidate link is assessed to determine a change to the value of its metric that causes a desired change to the original routing. Not all changes to the metric will cause a change in routing, and not all changes in routing will produce a decrease in utilization on the candidate link. The routing protocols generally use the assigned metric to compare alternative routes for a given traffic flow between nodes. If the candidate link provides the only path for a particular traffic flow, the routing of that path will always include this link, regardless of the value of the metric, because there is no alternative link for this segment of the path. In like manner, if the metric for this link is substantially different from any of the other links, small changes to the metric will not affect the routing based on a comparison of these metrics. Only when the metric is comparatively similar to another metric will a change to the metric have a potential effect on the choice of routes for the particular traffic flow.

In FIG. 1D, the load across link A is illustrated as a function of link A's metric. FIG. 1B identifies that the metric of link A has a metric value of 10. Based on this metric, each of the four traffic demands (SF-NY, SF-CH, SF-AT, SF-HO) are preferably routed along link A, amounting to 160 Mb/s, as discussed above. If link A's metric is increased to 11, there will be no change, because the composite metric for each preferred route A-F-N-O (43), A-F-N (31), A-F-H (37), and A-C (35) based on this metric will still be the lowest among the alternative routes for each demand.

If link A's metric is 14, the composite metric for route A-C (14+24)) will be equal to the composite metric for route B (38) for the demand SF-HO. In that case, the 20 Mb/s demand from SF to HO will be shared equally by route B and route A-C, reducing the load on link A to 150 Mb/s (160−(20/2)), as illustrated at 160 in FIG. 1D. If link A's metric is 15, the composite metric for route A-C (15) will be larger than the metric for route B (14), and thus route B will be the preferred route, removing all of the 20 Mb/s demand from SF to HO from link A, as illustrated at 165 of FIG. 1D.

If link A's metric is 18, the composite metric for route A-F-H (18+16+10) will equal the composite metric for route D (44) for the demand SF-AT, and half of the 40 Mb/s demand will be shared between route D and route A-F-H, removing another 20 Mb/s from the demand on link A, as illustrated at 170. If link A's metric is 19, route D will be preferred for this demand, and the entire 40 Mb/s demand from SF to AT will be removed from link A, as illustrated at 175.

Similarly, if link A's metric is 20, the 50 Mb/s demand from SF to NY will be shared between route A-F-N-O and route R-K-N-O, and the 40 Mb/s demand from SF to CH will be shared between route A-F-N and R-K-N, reducing the load on link A by another 50 MB/s, as illustrated at 180; and completely removed from link A if link A's metric is 21 or more, as illustrated at 185.

Note that a similar off-loading of demand from link A can also be achieved by reducing the metric of other links. For example, if link A's metric is the original value of 10, reducing link B's metric to 34 will result in the sharing of the SF-HO demand between routes A-C and B, and reducing link B's metric will remove the entire SF-HO demand from link A. In this case, the reduction of load on link A is achieved by 'attracting' load to link B.

In accordance with an aspect of this invention, the metric of a candidate link is only modified in such a way so as to cause the routing protocol to remove traffic from that link. Conventionally, a lower metric is favorable for routing, and in such cases, the system is configured to modify the metric only by increasing it. If a particular protocol is configured to favor higher metrics, the system would be configured to modify the metric by decreasing it. For ease of reference, the term 'increasing the metric' is used herein for 'changing the metric of a link in such a manner as to cause the routing protocol to deter traffic from that link'.

The inventors have recognized that rerouting traffic to offload traffic from specific over-utilized links has fewer secondary effects than rerouting traffic to increase traffic on specific under-utilized links. The potential increase of traffic to another link by making the current link less attractive is bounded by the particular traffic flows on the current link, whereas the potential increase in traffic to the current link by making the link more attractive is bounded only by the total amount of traffic from all other links that could use the current link. The offloading of specific traffic flows from a link typically affects only the links used in the alternate routes for the diverted traffic flows, whereas the attraction of flow to an underutilized link often produces a compounding effect on the routing and traffic flow across multiple links, and is significantly more complex to predict. That is, each demand that has a composite metric of a current route that is comparable to the composite metric of a route that includes the attracting link may be switched to the route that includes the link.

Optionally, the determination of the increase in the metric that improves performance can also be limited to a change that also assures that no constraints are violated. In this manner, the process can be used to find metrics that will eliminate constraint violations at each link.

Returning to the flow diagram of FIG. 2, having determined an increase in the metric that will introduce a change to the routing of one or more traffic flows, and optionally remove or ameliorate constraint violations at the targeted links, at 245, the system determines the effect of this change on the network performance, at 250. If, at 260, the metric change results in a performance improvement, the changed metric and corresponding changed network performance is saved for further consideration, at 265. Otherwise, if, at 260, the change does not improve the network performance, the new metric is not saved. Optionally, if the change eliminates a constraint violation without introducing another constraint violation in the network (a "Pareto-efficiency" solution), the new metric may be saved for further consideration, regardless of other measures of network performance; that is, eliminating a violation can be considered an improvement in network performance, regardless of the defined numerical measure of network performance. In like manner, the elimination of a constraint violation can cause the network performance measure to increase by a given amount, so that the elimination of multiple constraints has a cumulative effect on the network performance measure.

After all of the candidate links are assessed, or some other stopping criteria is met, at 270, the improvement in network performance will have been determined for each identified metric modification. Some or all of these modifications are selected for implementation on the network, at 280. For example, the amount of improvement in the network performance can be used to prioritize the metric modifications for selection, such that metric changes that provide the most improvement in the network performance are selected, or such that only metric changes that provide an improvement above a given threshold are considered for selection, or such that any metric change that eliminates a constraint violation is given priority for selection. Similarly, the selected changes can be limited to a maximum number of changes, or a particular number of changes that exceed a particular performance goal.

One of skill in the art will recognize that the change of one metric may affect the margin of improvement that subsequent changes of the remaining metrics will provide. That is, in the selection of metrics to change, the margins of improvement are based on the current level of performance, and the selection of the first metric change will provide a different 'current level of performance' than the next change will provide. Conventional multi-variate optimization techniques may be applied to address this issue. For example, in a straightforward embodiment, a 'greedy' algorithm is used, wherein the metric change that provides the largest margin of improvement is first selected, then the entire process 240-280 is repeated to determine the next change that provides the largest margin of improvement, based on the measure of performance provided by the first metric change.

When the targeted links are only those that have constraint violations, so that the process is configured to 'repair' the network, a 'hill-climbing' algorithm may be used for selecting from among the metrics that eliminate such constraint violations. In this process, a cost is associated with each metric change. Each of the targeted links is assessed to determine the change required to eliminate the violation and the cost corresponding to this change. From among all of the evaluated links with violations, the least cost metric change is selected to eliminate the corresponding violation, and the process is repeated until either all violations are eliminated or until a given number of metric changes is reached.

Other techniques for selecting from among the determined metrics that provide an improvement in network performance are presented further below.

After the metric changes are selected for implementation in the network, the system is configured to generate command files that can be used to automate the reconfiguration process, at 290. In a preferred embodiment, the system provides the set of change orders and other information corresponding to the change set in a form that facilitates further analysis before the changes are actually implemented on the network. Copending U.S. patent application Ser. No. 11/503,553, "INCREMENTAL UPDATE OF VIRTUAL DEVICES IN A MODELED NETWORK", filed 11 Aug. 2006 for Pradeep Singh, Raymond Onley, Nishant Gupta, and Alain Cohen, and incorporated by reference herein, teaches a technique for providing incremental changes to the configuration of modeled networks ("configlets") so that the assortment of network analysis tools commonly used can be used to assess the impact of such changes. In a preferred embodiment of this invention, the system will automatically produce the "configlets" corresponding to the configuration change required to implement the identified changes. These generated configlets are also used to implement the selected changes on the actual network, typically via executable command files.

In addition to improving network performance and eliminating constraint violations, the principles of this invention can also be applied to improve the resiliency of a network. In a typical network, when a link failure occurs, the network re-routes the demands that use that link. For example, in the network of FIG. 1A, if link N fails, the 60 Mb/s SF-NY demand will be re-routed from route A-F-N-O to the next preferable route (a secondary route) that does not use link N; in this case, to route A-E. In like manner, the 40 Mb/s SF-CH demand will be re-routed from A-F-N to R-J. Note, however, that this failure of link N will introduce a new demand of 60 Mb/s to link E and 40 Mb/s to links R and J. Depending upon the capacity and other loads of links E, R, and J, this re-routed demand may introduce constraint violations, over-utilized links, and so on.

The system of this invention can be used to determine the effects of a failure of a link by evaluating the network performance when the secondary routes are used. Then, changes to the link metrics that modify the routing can be evaluated to determine whether an improvement to the performance can be achieved in the network under a failure condition, preferably without adversely affecting the network performance without the failure condition. As in the basic approach, the change to a link's metric is limited to a change that decreases the demand on the link, rather than attracting loads to under-utilized links. As also in the basic approach, the network improvement can be based on the change of a single metric or a set of metrics.

Figure 3:
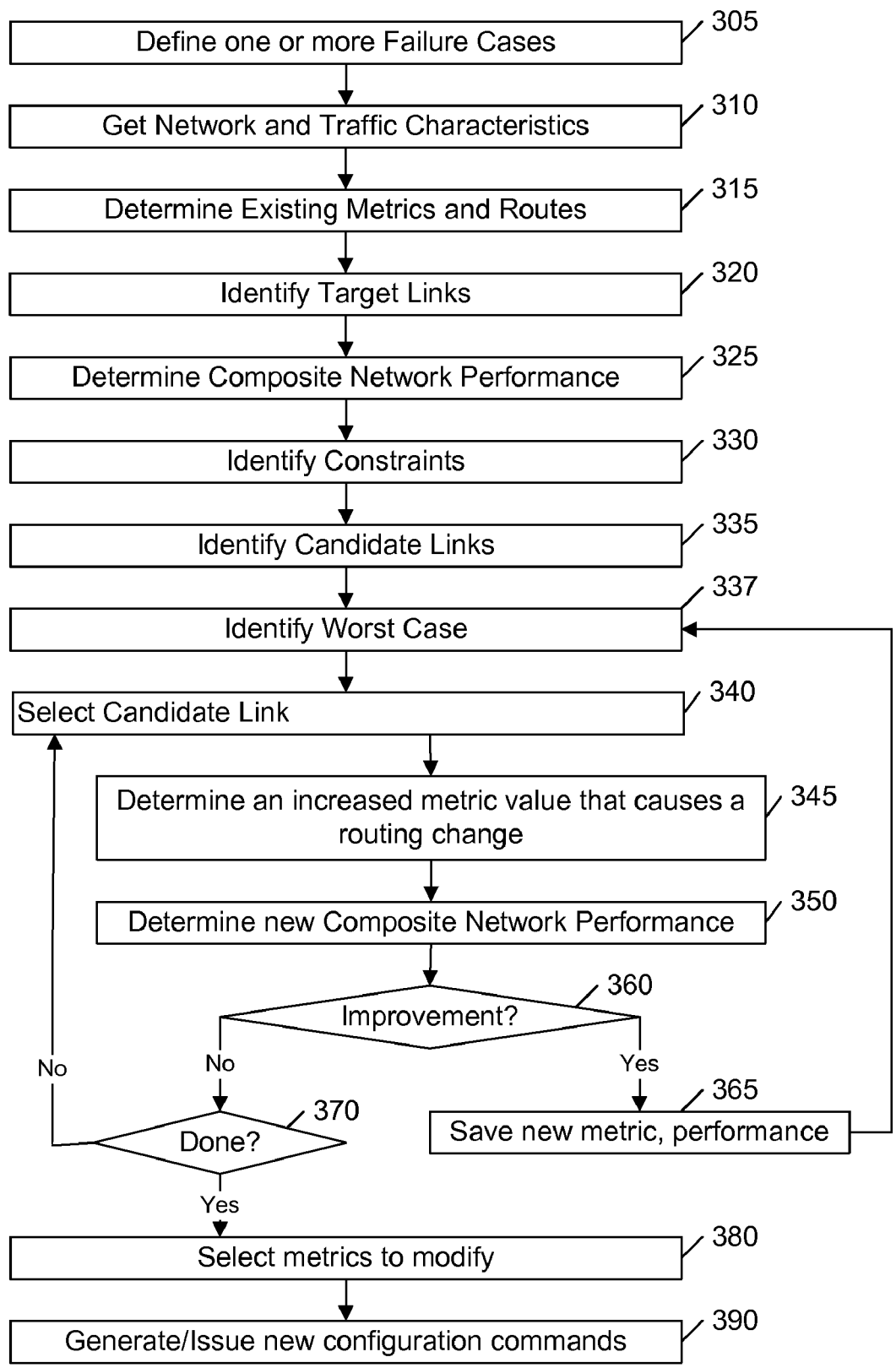
FIG. 3 illustrates an example flow diagram for iteratively improving network resiliency in accordance with an aspect of this invention.

FIG. 3 illustrates an example flow diagram for improving network performance under fault conditions. At 305, one or more failure cases are defined for evaluation. Each failure case defines a potential failure hypothesis, and may include a failure of a particular link, a concurrent failure of multiple links, and so on. The set of failure cases may include, for example, all individual links, or it could be determined according to user or system-defined selection criteria. For example, links with the highest utilization, links with the largest amount of traffic, or links with the highest priority traffic are obvious choices for failure evaluation. In a more complex embodiment, each link of a set of given links is failed and the resultant performance measure determined. The links whose failures cause the most severe degradations are identified, and either the system or the user selects one or more of these links as the set of failure cases to be assessed. For ease of reference, the network conditions under the fault-free/baseline condition and each of these select failure cases is hereinafter termed the set of assumed network conditions for this assessment.

The process of 310-335 is the same as detailed above with regard to 210-235 of FIG. 2, except that at 325, the performance measure is determined for each of the assumed network conditions. Using these performance measures, a 'composite' network performance measure is determined. In a straightforward embodiment of this invention, the composite network performance may merely be the peak link utilization among all of the assumed network conditions. In other embodiments, the composite network performance may be a weighted average of the peak utilizations among the assumed conditions, typically with a heavier weighting given to the fault-free condition. In like manner, the composite network performance measure may be the number of utilizations that exceed a given threshold, or set of thresholds, or a weighted average of this number. One of skill in the art will recognize that other means for determining a composite measure of network performance under the set of assumed network conditions may also be used.

The process 330-380 evaluates the network to determine whether the baseline metrics can be modified to improve the network performance in view of the set of assumed network conditions. At 330, constraints are defined for this determination. In a preferred embodiment, the user is provided the option to allow a metric change that causes the fault-free system performance to degrade by up to a specified amount, if that degradation results in a substantial improvement in the system performance under one or more fault conditions. That is, for example, the thresholds and measures used for evaluating and/or improving the primary routes during this network resiliency improvement process may be different than the thresholds and measures used for evaluating and improving the primary routes without regard to network robustness under failure conditions. The determination of primary routes in the baseline configuration may be based on a first set of measures and criteria, but a less stringent set of measures may be allowed for these routes if the network resiliency can be improved. For example, a peak link utilization threshold of 50% may be used for initially determining the metrics, but relaxed to a fault-free peak link utilization threshold of 60% to achieve a significant improvement in performance under one or more failure conditions. As noted above, the peak link utilization threshold under a failure condition would generally be higher than the threshold used for a fault-free condition; in this example, a peak link utilization threshold of 85% or more may be set for the faulted condition.

To improve the efficiency of this assessment among the set of assumed network conditions, in a preferred embodiment, the "worst case" condition is identified, at 337, typically based on the performance measures of the fault-free and each failure case condition, although any of a variety of techniques can be used to identify a worst case condition. For example, maximum link utilization may be used for evaluating network performance, while the number of link utilization violations under each condition may be used to identify the worst case condition.

The loop 340-380 assesses each of the candidate links to determine metric changes that improve the composite network performance. As is detailed further below, as each potential improvement is identified, the determination of a new worst case is repeated. In a preferred embodiment, the order of evaluating each link of the set of candidate links is based on the severity of the degradation at each link, such as an order based on the peak link utilization of each candidate link among the set of assumed network conditions.

At 345, the metric of the candidate link at which a routing change occurs is identified, as detailed above with regard to block 245 in FIG. 2; as in block 245, only a metric change that causes traffic to be offloaded from the candidate link is considered. Based on this routing change, a resultant composite network performance is determined, at 350, and at 355, this new composite is compared to the composite without this routing change, at 360. If the metric/routing change does not provide for an improvement in the composite measure, the process is repeated for the next candidate link, at 380, or terminated if a given stopping criteria is reached, such as determining a maximum number of metric changes, or achieving a given level of composite system performance.

If, at 360, the metric/route change amounts to an improvement in the composite performance measure, or an improvement above a given threshold, this change and its resultant performance is saved, at 365, and the process is repeated based on this change and resultant performance, beginning with identifying a new worst case, at 337. This iterative improvement technique is merely one of a variety of multivariate optimization techniques that can be applied to determine a 'best' set of changes in rank order.

Upon completion of the above process, the best metric changes from among all of the preferred metric changes associated with the set of assumed network conditions are selected for implementation in the network, at 385. The selected set of metric changes in this example embodiment corresponds to a selection from the rank-ordered list provided by the iterative process 330-380 to identify a given number of changes with a resultant composite performance that these changes provide, or to identify a set of changes to achieve a given level of composite performance.

One of skill in the art will recognize that alternative means for selecting a set of metrics that have the 'best' affect on the composite network performance may be used. For example, the selection of a set of metrics to modify may be based on multiple failure conditions. Instead of selecting a set of metrics based on the total number of violations, for example, the selection may be based on the number of failure conditions causing violations. That is, a set of metric changes that results in three violations for a single failure condition may be preferred to a set of metric changes that results in one violation for each of two failure conditions, because the likelihood of either of two failure possibilities is greater than the likelihood of a single failure possibility, and thus 'one or more' violations are likely to occur more often in the two failure possibilities case. In like manner, the selection may be based on a combination of the number of violations and the number of failure conditions that produce these violations.

At 390, command files for implementing these metric changes on the network are created, preferably using 'configlets' as detailed above with regard to 290 in FIG. 2.

The above described techniques provide the basic principles involved in this invention. As noted above, a variety of alternative techniques or optimizations can be applied to improve the efficiency of this system improvement process, to facilitate the use of this invention for improving the performance and resiliency of large network.

For example, the utilization of a link can be expressed as a function of the routing metric for the link, as illustrated in the graph of FIG. 1D. In a preferred embodiment of this invention, the metric values at which each change of utilization occurs (160-185 of FIG. 1D) are computed and represented as a list of metric and utilization pairs. If a particular link utilization is desired, the list of metric and utilization values can be accessed directly to select the appropriate metric value, rather than using repeated trials to achieve the desired link utilization. If the lists are large, efficient search techniques, such as a binary search, can be used to reduce the time required to find either the metric value corresponding to a link utilization, or a link utilization corresponding to a metric value.

With regard to selecting from among all of the metric changes that provide a given level of improvement in system performance, a number of variations and/or alternatives to the aforementioned 'greedy' and 'hill-climbing' algorithms can be used.

As noted above, the hill-climbing algorithm is particularly well suited for repairing constraint violations in a network by identifying the least cost metric changes for iteratively eliminating each violation. This hill-climbing technique can also be used to optimize the network performance by iteratively modifying the value of the constraint, thereby identifying the least cost metric change for achieving different levels of constraints. In an example embodiment, the peak link utilization of a violation-free baseline configuration is used as a starting threshold value. At each iteration, the threshold peak link utilization is decreased by a given factor until a set of metrics cannot be found to provide a violation-free configuration. Thereafter, the threshold peak link utilization is increased by an amount less than the prior decrease, and the process is repeated. At each iteration, the size of the threshold change monotonically decreases as the best set of metrics are defined to achieve a lowest violation-free maximum peak utilization. Any of a plurality of stopping criteria may be applied, such as stopping when the size of the threshold change is below a given value, stopping when a given number of iterations are performed, stopping when a given maximum peak utilization is achieved, and so on.

Although a binary search for these best metrics may be used, wherein each threshold change is half the magnitude of the prior change, an asymmetric exponential search has been found to be well suited for this application. In this exponential search, the achievable threshold value is multiplied by a given factor to determine the next threshold value, and this factor is iteratively varied to search for the metrics that provide the lowest violation-free peak link utilization. The achievable threshold value is initialized to the current peak link utilization and multiplied by the factor on the first iteration; if enforcing this new threshold peak link utilization does not introduce a violation, this achievable threshold value is multiplied by the square of the factor. If no violations are introduced, this new achievable threshold value is multiplied by the cube of the factor; and so on, incrementing the exponent of the factor with each achievable violation-free threshold. If enforcing a given threshold value causes a constraint violation, the exponent is reduced by half, and the process is repeated using the prior achievable violation-free threshold.

The aforementioned techniques search for 'best' metrics to change substantially one-at-a-time. Such techniques could lead to sub-optimizations by missing combinations of metric changes that might provide cumulative improvements that are greater than the improvements provided individually by a same number of metric changes.

A number of conventional search techniques are well suited for finding combinations of factors that provide better solutions than other combinations of factors. One such technique iteratively randomly selects a set of factors from a variety of candidate factors, and records the set that provides a better solution than any prior solution. As applied to this application, a candidate set of links can be defined, such as the "N" links that have the highest utilization. At each iteration, "M" of these "N" links are randomly selected, and the metrics of all of the M links are increased to determine the network improvement that can be achieved by making these M changes. If the improvement achieved by the current set of M changes is greater than a prior 'currently best' set of M changes, the current set replaces the 'currently best' set, and the iterations continue. The iterations continue until a stopping rule is encountered, such as a given number of iterations have occurred, or a given level of network improvement is achieved, and so on.

A variant of this "best M changes" approach includes, for example, defining a probability of selection of each link, to bias the random selection according to this probability. For example, the probability of selection can be based on the link utilization, so as to assure that highly utilized links are more likely to be selected in each iteration.

Another variant on this approach is to evaluate the effects of multiple changes of a selected link's metric. That is, since the 'cost' of implementing a metric change is independent of the magnitude of the change, a 'best' change for each of the M metrics is preferably selected. However, such a determination of the best value to use for each of M metrics that are to be changed is a combinatorial determination. That is, if M is three, and each of the three metrics has four viable metric values (metric values that improve performance without introducing constraint violations), there are sixty-four ($4^3$) possible combinations for these three metric changes. In a preferred embodiment, the evaluation of alternatives is limited to a given number of alternatives, randomly selected in a monotonic fashion; that is, randomly selected such that there are no gaps between viable values for each metric.

With regard to the processes used to improve the resiliency of the network under failure conditions, the basic iterative network improvement process is repeated for each evaluated failure condition. Therefore, in addition to the above techniques used to improve the efficiency of the basic iterative network improvement process, techniques that avoid this iterative process during the resiliency-improvement process may also provide for substantial efficiency improvements.

One such technique for avoiding the iterative network improvement process is to avoid the determination of metric changes to improve network performance (step 330 of FIG. 3) for each potential failure candidate, based on an upper bound on the worst case utilization that might occur for each failure candidate. As each link is failed, each of the other links that receive increased utilization is marked as being affected by the failure. If the maximum utilization among all of the affected links is below the threshold maximum utilization, then there is no need to determine metric changes that will improve the maximum utilization under this failed condition.

Other techniques for optimizing or avoiding the various tasks described above will be evident to one of skill in the art.

Figure 4:
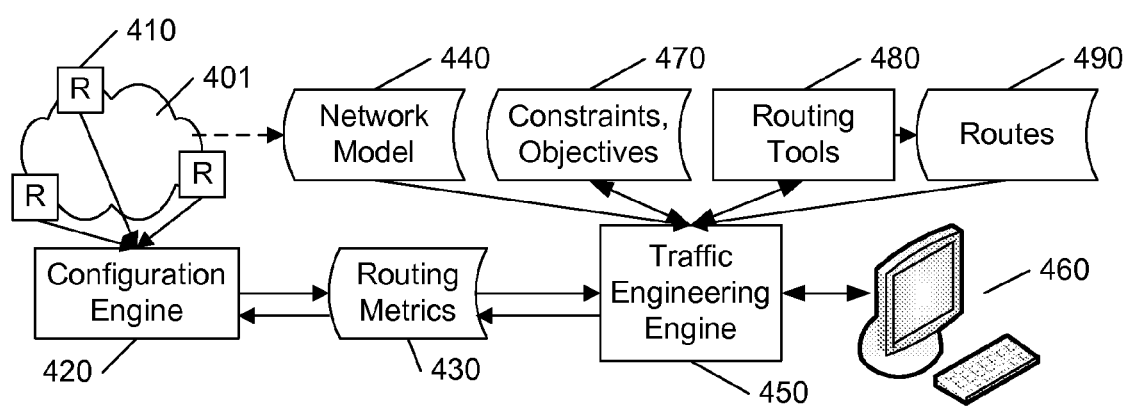
FIG. 4 illustrates an example block diagram of a traffic engineering system in accordance with this invention.

FIG. 4 illustrates an example block diagram of a traffic engineering system in accordance with this invention. The core of the system is a traffic engineering engine 450 that is configured to execute the above described processes, under the control of a user interface system 460.

The traffic engineering engine 450 receives a network model 440 that describes an actual network, or a proposed network, or a combination of actual and proposed components forming a network 401. For ease of reference, the network 401 is presented hereinafter as being an actual network. A configuration engine 420, which may be a component of the traffic engineering engine 450, queries the components 410 of the network 401 to determine the network configuration, including the current routing metrics 430.

As discussed above, the user is provided the option of defining constraints that are to be enforced, if possible, by the traffic engineering engine 450. The user is also provided the option of defining or selecting objectives in the form of tasks to be accomplished by the engine 450. For example, the user may define the objective as being the elimination of any current constraint violations, or a reduction in peak link utilization, or an identification of preferred metric changes from a least-cost maximum-benefit viewpoint, and so on.

One or more routing tools 480 are provided to emulate the routing algorithms that are used at the components 410 of the network 401. These routing algorithms determine the routing 490 for traffic between source and destination nodes on the network, based on the topology of the network and the routing metrics 430. The topology of the network may be provided by the network model 440, or derived from the network 401 by the configuration engine 420, or a combination of both. The traffic between source and destination nodes is generally defined as a demand for a given amount of traffic per unit time, and may be included in the network model 440, or provided from an alternative source, typically via the user interface 460. In a preferred embodiment, the user is provided the option of adding, deleting, or modifying the defined traffic between nodes.

In accordance with the principles of this invention, the engine 450 is configured to evaluate the performance of the modeled network based on the defined routing of traffic among the nodes of the network, and to identify preferred changes to the metrics 430 to satisfy the defined objectives, subject to the defined constraints, for presentation to the user at 460. The techniques used by the engine 450 for identifying the preferred changes to the metrics 430, and for performing other tasks, are detailed above.

If the user decides to implement select changes to the metrics 430, the engine 450 is also configured to communicate the revised metrics 430 to the configuration engine 420, which is preferably configured to communicate these revised metrics to the appropriate components 410 in the network 401, as detailed above.

The foregoing merely illustrates the principles of the invention. It will thus be appreciated that those skilled in the art will be able to devise various arrangements which, although not explicitly described or shown herein, embody the principles of the invention and are thus within its spirit and scope. For example, a variety of visualizations can be provided to the user at various stages of the process to allow the user to control the analysis and improvement tasks as desired. In an example embodiment, the graph of FIG. 1D is displayed for each select link to show the utilization of the link as a function of the routing metric. The user is provided the opportunity to select a metric that provides a desired link utilization for the selected link. In like manner, during the failure analysis procedure, a routing map such as illustrated in FIG. 1A can be displayed, to provide the user the option of selecting each link to be failed, with a corresponding display that highlights the links that are affected and/or fail to satisfy the peak utilization threshold. These and other system configuration and optimization features will be evident to one of ordinary skill in the art in view of this disclosure, and are included within the scope of the following claims.

In interpreting these claims, it should be understood that:
a) the word "comprising" does not exclude the presence of other elements or acts than those listed in a given claim;
b) the word "a" or "an" preceding an element does not exclude the presence of a plurality of such elements;
c) any reference signs in the claims do not limit their scope;
d) several "means" may be represented by the same item or hardware or software implemented structure or function;
e) each of the disclosed elements may be comprised of hardware portions (e.g., including discrete and integrated electronic circuitry), software portions (e.g., computer programming), and any combination thereof;
f) hardware portions may be comprised of one or both of analog and digital portions;
g) any of the disclosed devices or portions thereof may be combined together or separated into further portions unless specifically stated otherwise;
h) no specific sequence of acts is intended to be required unless specifically indicated; and
i) the term "plurality of" an element includes two or more of the claimed element, and does not imply any particular range of number of elements; that is, a plurality of elements can be as few as two elements, and can include an immeasurable number of elements.

We claim:

1. A method comprising:
identifying a first plurality of metric values of a metric parameter that is used by a routing protocol to select first routes for communication of messages among nodes of a network, each metric value being associated with a corresponding link of a plurality of links of the network,
determining, by a network analysis system, a plurality of failure effects based on modifications of the first routes by the routing protocol based on a plurality of hypothetical failure conditions,
selecting a hypothetical failure condition based on the plurality of failure effects determining a first network performance measure based on the modification of the first routes by the routing protocol based on the selected hypothetical failure condition of a plurality of hypothetical failure conditions of the network, and
determining a second network performance measure based on a proposed second plurality of metric values and corresponding second routes based on the selected hypothetical failure condition of the plurality of hypothetical failure conditions and a modification of one or more select metric values of the first plurality of metric values, and
wherein:
each failure effect corresponds to a number of link utilizations that exceed a given threshold due to the corresponding hypothetical failure condition
the modification of the one or more select metric values is substantially limited to modifications that cause the routing protocol to reduce a number of routes that include the links corresponding to the modified metric values, and
if the second network performance is an improvement over the first network performance measure, identifying one or more configuration changes that will enable use of the proposed second plurality of metric values on the plurality of links of the network.

2. The method of claim 1, wherein the improvement of the second network performance measure corresponds to a reduction in a number of link utilizations that exceed a first threshold due to the hypothetical failure condition.

3. The method of claim 2, wherein the improvement of the second network performance measure corresponds to a reduction in a number of link utilizations that exceed a second threshold based on the first routes, without the hypothetical failure condition.

4. The method of claim 2, wherein the improvement of the second network performance measure corresponds to an elimination of link utilizations that exceed a second threshold based on the first routes, without the hypothetical failure condition.

5. The method of claim 4, wherein the improvement of the second network performance measure corresponds to an elimination of link utilizations that exceed the second threshold due to the failure condition.

6. The method of claim 1, wherein the first and second network performance measures correspond to a maximum of link utilizations of the plurality of links.

7. A system comprising:
a user interface that is configured to receive a link utilization threshold,
a routing tool that is configured to determine routes on a network based on a metric parameter and a corresponding first plurality of metric values of the metric parameter, each metric value being associated with a corresponding link of a plurality of links of the network,
a traffic engineering engine that is configured to perform the method of:
identifying a first plurality of metric values of a metric parameter that is used by the routing tool to select first routes for communication of messages among nodes of a network, each metric value being associated with a corresponding link of a plurality of links of the network,
determining, a plurality of failure effects based on modifications of the first routes by the routing tool based on a plurality of hypothetical failure conditions, selecting a hypothetical failure condition based on the plurality of failure effects determining a first network performance measure based on the modification of the first routes by the routing protocol based on the selected hypothetical failure condition of the network, determining a second network performance measure based on a proposed second plurality of metric values and corresponding second routes based on the selected hypothetical failure condition and a modification of one or more select metric values of the first plurality of metric values, wherein:

each failure effect corresponds to a number of link utilizations that exceed the link utilization threshold due to the corresponding hypothetical failure condition the modification of the one or more select metric values is substantially limited to modifications that cause the routing protocol to reduce a number of routes that include the links corresponding to the modified metric values, and, if the second network performance measure is an improvement over the first network performance measure, identifying one or more configuration changes that will enable use of the proposed second plurality of metric values on the plurality of links of the network.

8. The system of claim 7, wherein the first and second network performance measures include a number of the violations.

9. The system of claim 7, wherein the improvement includes a reduction in a maximum of link utilization among the plurality of links.

10. The system of claim 7, wherein the traffic engineering engine is configured to modify the one or more select metric values by:

selecting a candidate link having a link utilization that exceeds the link utilization threshold, determining a new value of the select metric value corresponding to the candidate link to achieve a new link utilization that does not exceed the link utilization threshold, and setting the select metric value to the new value.

11. The system of claim 10, wherein the traffic engineering engine is configured to:

identify each of a set of metric values of the candidate link that provide a reduction of the link utilization for the candidate link, and determine the new value includes selecting from the set of metric values.

12. The system of claim 7, wherein the traffic engineering engine is configured to:

determine a third network performance measure based on a modification of the second routes by the routing protocol based on a hypothetical failure condition of the network, and determine a fourth network performance measure based on a proposed third plurality of metric values and corresponding third routes based on modification of one or more other select metric values of the second plurality of metric values, and, if the fourth network performance measure is an improvement over the third network performance measure, identify one or more other configuration changes that will enable use of the proposed third plurality of metric values on the plurality of links of the network.

13. A system comprising:

a routing tool that is configured to determine routes on a network based on a metric parameter and corresponding first plurality of metric values of the metric parameter, each metric value being associated with a corresponding link of a plurality of links of the network, a traffic engineering engine that is configured to perform the method of:

identifying a first plurality of metric values of a metric parameter that is used by the routing tool to select first routes for communication of messages among nodes of a network, each metric value being associated with a corresponding link of a plurality of links of the network, determining a plurality of failure effects based on modifications of the first routes by the routing tool based on a plurality of hypothetical failure conditions, selecting a hypothetical failure condition based on the plurality of failure effects determining a first network performance measure based on the modification of the first routes by the routing tool based on the selected hypothetical failure condition of the network, and determining a second network performance measure based on a proposed second plurality of metric values and corresponding second routes based on the selected hypothetical failure condition and a modification of one or more select metric values of the first plurality of metric values, wherein:

each failure effect corresponds to a number of link utilizations that exceed a given threshold due to the corresponding hypothetical failure condition the modification of the one or more select metric values is substantially limited to modifications that cause the routing protocol to reduce a number of routes that include the links corresponding to the modified metric values, and if the second network performance measure is an improvement over the first network performance measure, identifying one or more configuration changes that will enable use of the proposed second plurality of metric values on the plurality of links of the network.

14. The system of claim 13, wherein the improvement of the second network performance measure corresponds to an elimination of link utilizations that exceed a given threshold due to the failure condition.

15. The system of claim 13, wherein the first and second network performance measures correspond to a maximum of link utilizations of the plurality of links.

* * * * *